Aug. 11, 1931.     J. C. LUSSE     1,818,899
AMUSEMENT CAR APPARATUS
Filed Dec. 1, 1927     7 Sheets-Sheet 2

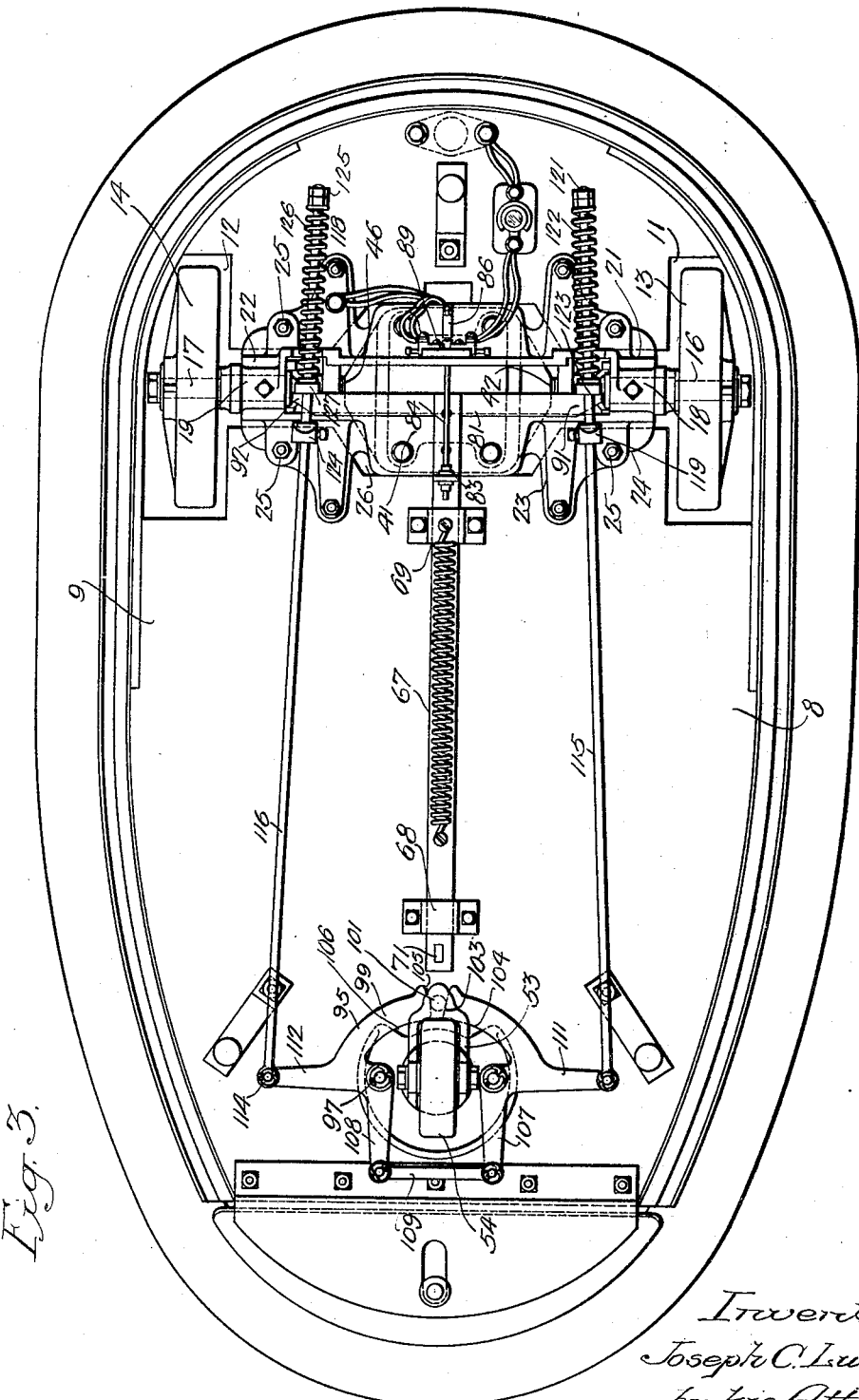

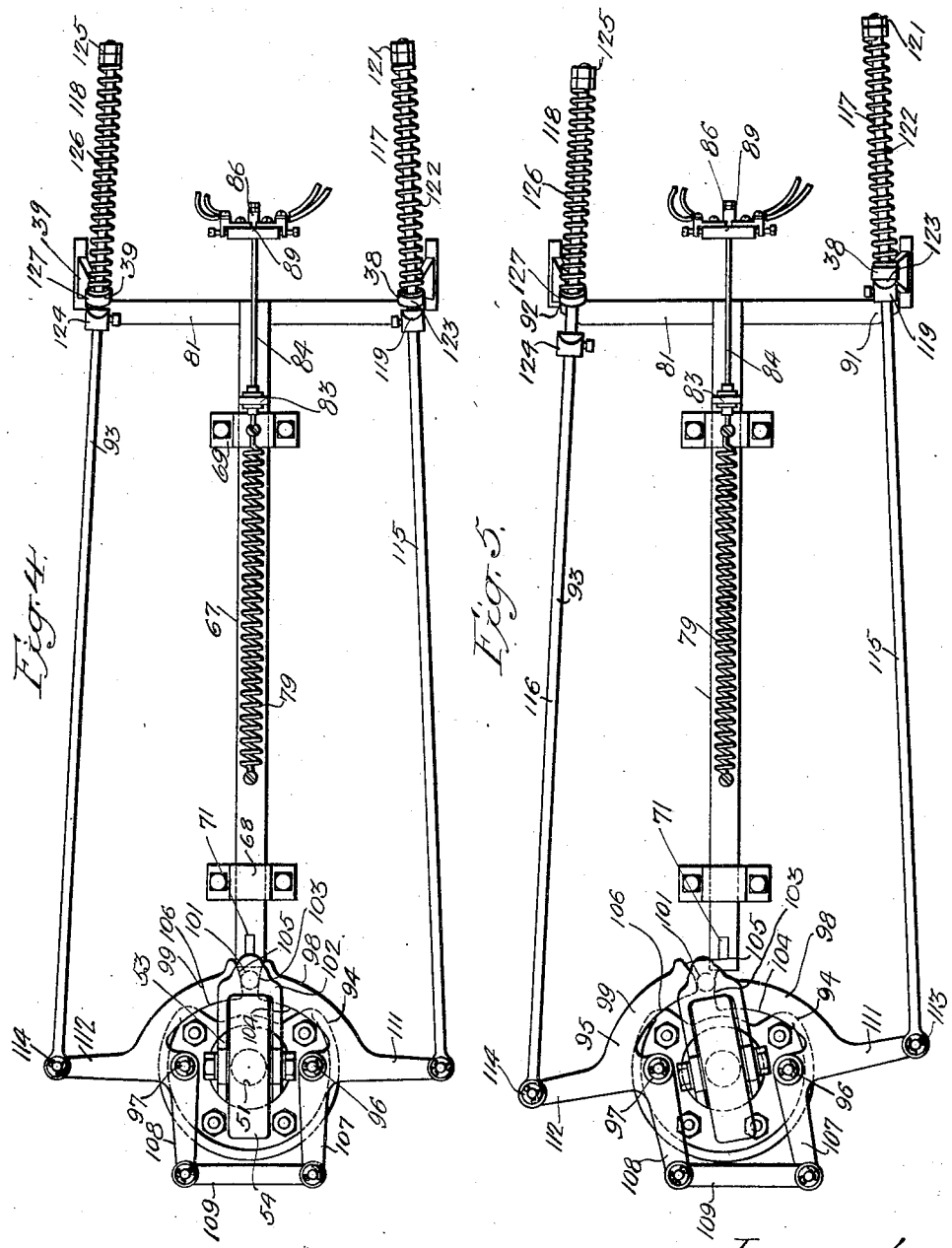

Aug. 11, 1931.  J. C. LUSSE  1,818,899
AMUSEMENT CAR APPARATUS
Filed Dec. 1, 1927  7 Sheets-Sheet 5
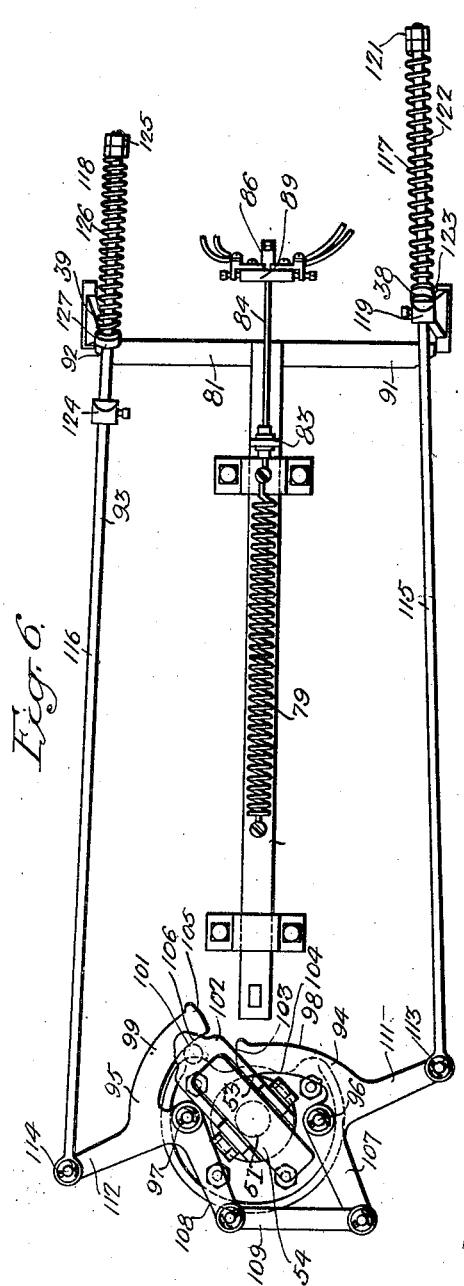
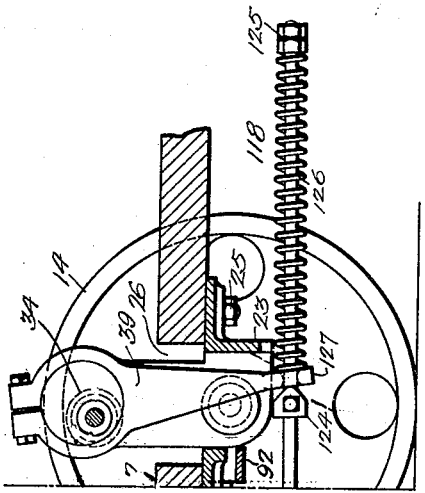
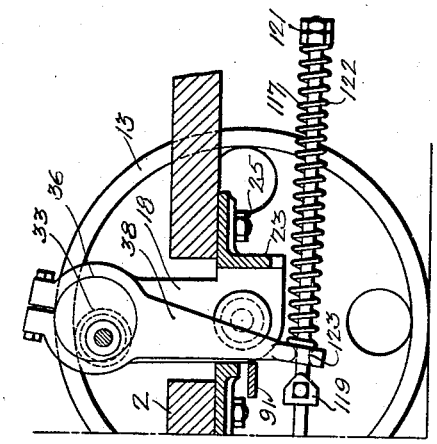
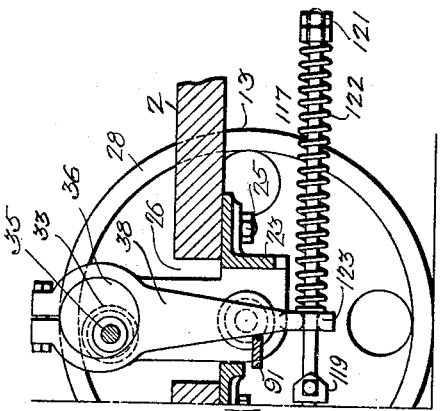

Aug. 11, 1931.  J. C. LUSSE  1,818,899
AMUSEMENT CAR APPARATUS
Filed Dec. 1, 1927  7 Sheets-Sheet 6

Inventor:
Joseph C. Lusse,
by his Attorneys
Howson & Howson

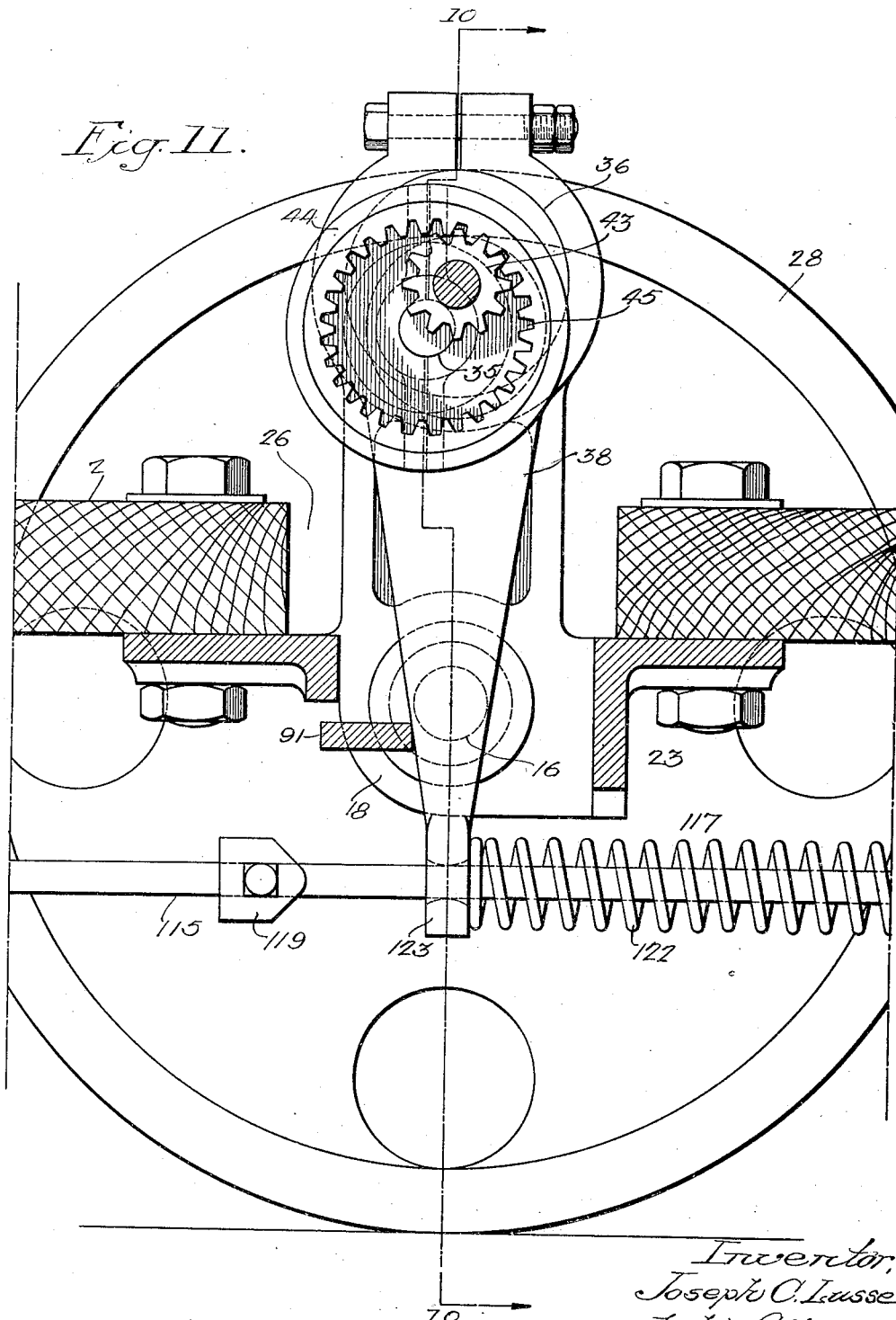

Patented Aug. 11, 1931

1,818,899

UNITED STATES PATENT OFFICE

JOSEPH C. LUSSE, OF PHILADELPHIA, PENNSYLVANIA, ASSIGNOR TO LUSSE BROS., INC., OF PHILADELPHIA, PENNSYLVANIA, A CORPORATION OF PENNSYLVANIA

AMUSEMENT CAR APPARATUS

Application filed December 1, 1927. Serial No. 237,003.

My invention relates to motor vehicles, having particular relation to such vehicles as are applicable to amusement parks.

In its broad aspect, one object of my invention is to provide a car, wherein a relatively small movement of the steering means causes a relatively large movement of the release mechanism and, more especially, the frictional driving element.

A more specific object of my invention is to provide apparatus of the character described, wherein one of the two car wheels is disengaged from its driving element before the steering wheel has moved through a substantial angle. Such quick disengagement permits the car to respond to the turning of the steering wheel with substantially no interference by the rear car wheels. Moreover, as a result of such quick release, the car may be turned quickly within a minimum radius. Furthermore, experience has shown that the wear on the front steering wheel is very greatly decreased. This is important, inasmuch as the steering wheel is provided with an expensive fabric contact surface.

Another object of my invention is to provide an amusement car constituting an improvement over that disclosed in my co-pending application, Serial No. 138,299, filed Sept. 28, 1926, wherein linkage employing a single cam plate is positioned intermediate a frictional driving element and a rotary swinging steering post.

Other objects and applications, as well as details of construction and operation, whereby my invention may be practiced will be apparent more fully hereinafter when taken in connection with the accompanying drawings, wherein Fig. 1 is a longitudinal, sectional view of a car embodying my invention, the sectional plane being taken on the line 1—1 of Fig. 2;

Fig. 3 is an inverted plan view of the structure of Fig. 1, showing the relative position of the steering wheel, control linkage and the switch when the parts are in their mid-position and the car is at a standstill;

Fig. 4 is a detail view of the controlling mechanism of Fig. 3, showing the position of the control linkage when the pedal mechanism has been actuated into its operating position;

Fig. 5 is a view similar to Fig. 4, showing the extent of movement of the steering wheel necessary to effect the disengagement of one of the two frictional driving elements from its co-operating traction wheel, while the pedal mechanism is in its forward operating position;

Fig. 6 is a similar view, showing the effect of a further actuation of the steering wheel, while the pedal mechanism is in its forward position;

Fig. 7 is an enlarged, transverse, sectional view taken on the line 7—7 of Fig. 2, showing the position of the frictional driving element in its disengaged position;

Fig. 8 is a view similar to Fig. 7, but showing the normal operating position of the frictional driving element, resulting from the actuation of the pedal mechanism into its forward position;

Fig. 9 is a similar view, illustrating the position of the frictional driving element and connected parts occurring upon the further turning of the steering wheel in the direction shown in Fig. 6;

Fig. 11 is a vertical, sectional view taken on the line 11—11 of Fig. 10; and

Figure 1:
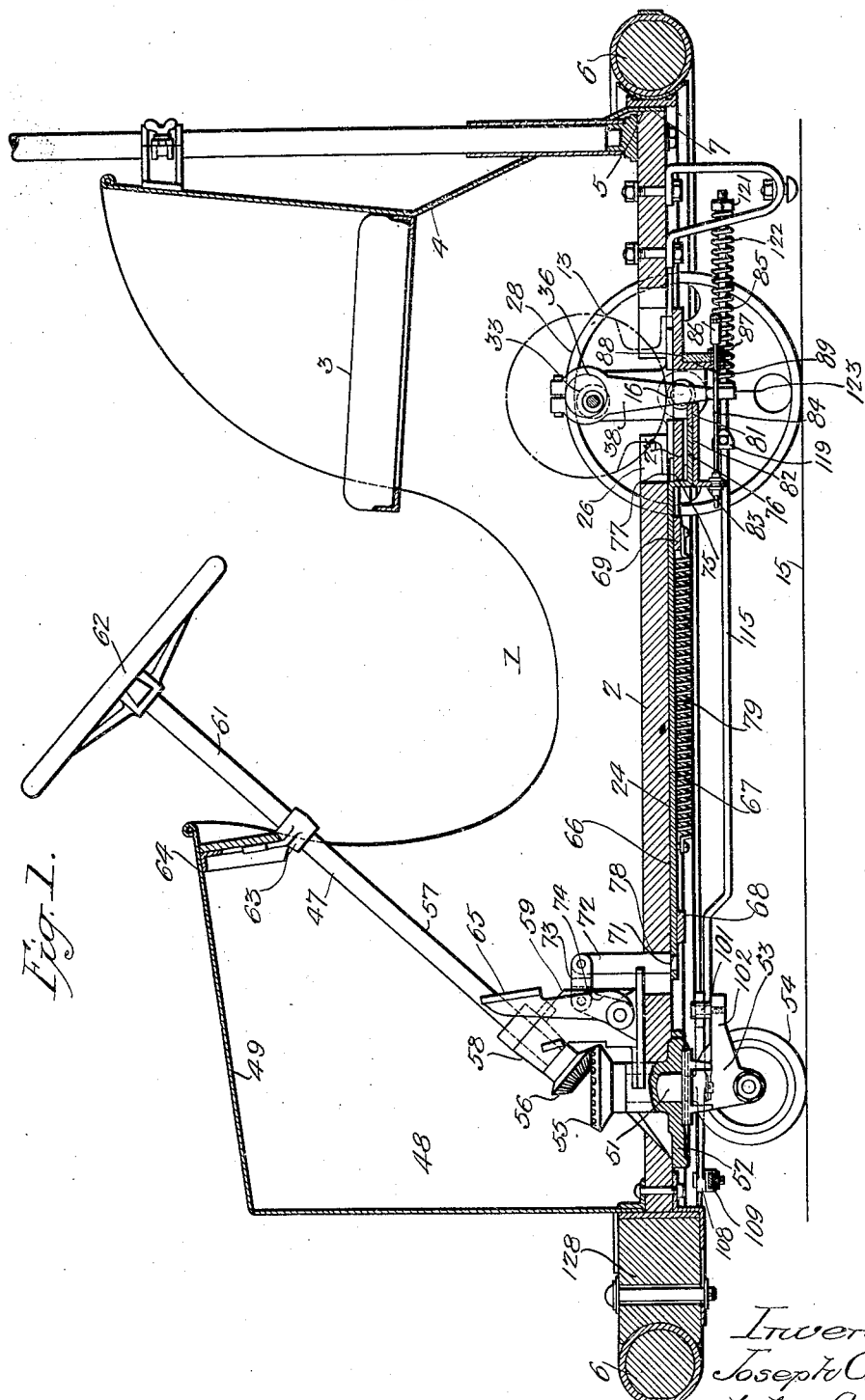
Figure 10:
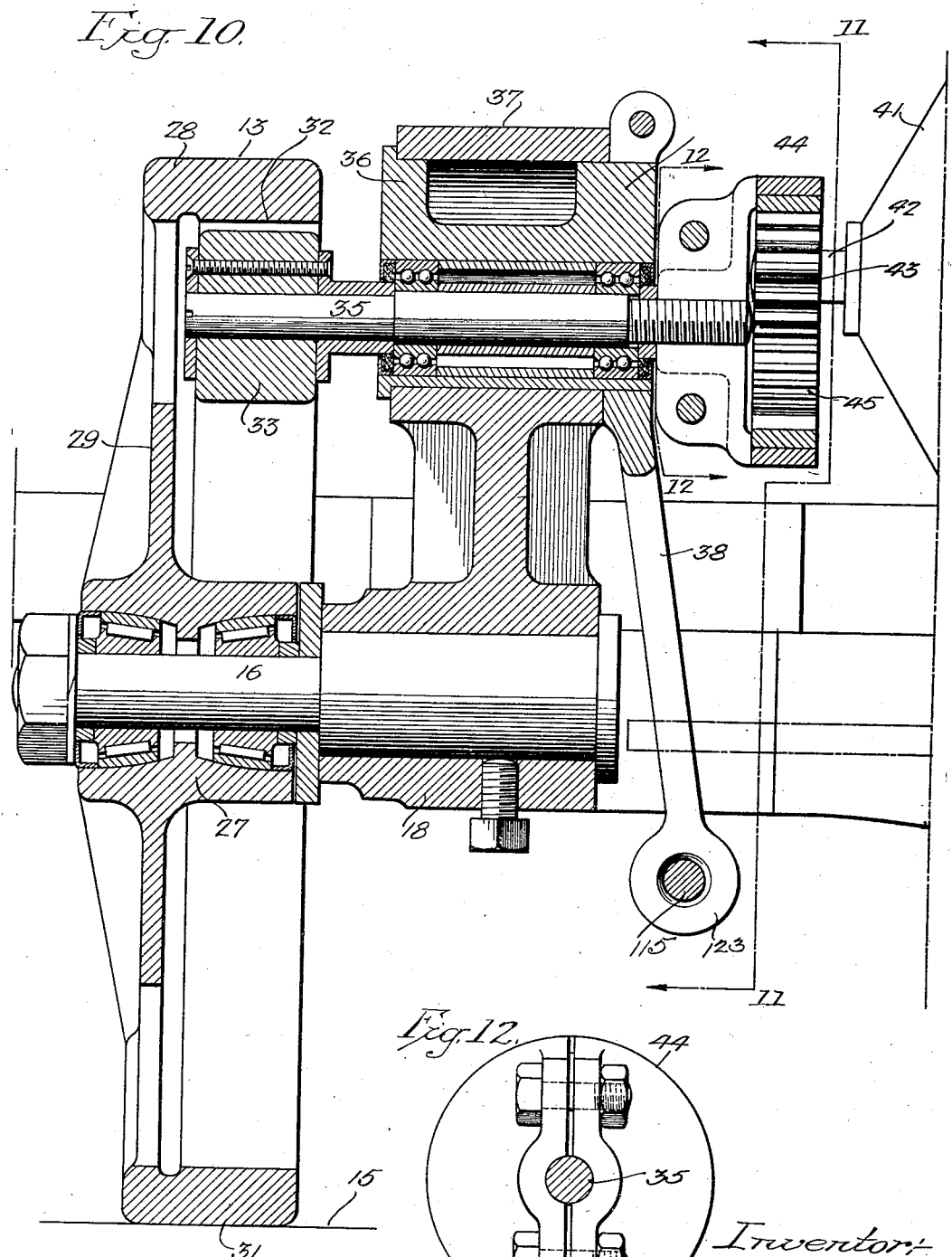
Fig. 10 is a still further enlarged, transverse, sectional view of the car wheel, the co-operating frictional wheel, the eccentric mounting means for the friction wheel and the gear-wheel mechanism connecting the friction wheel and the driving motor, the sectional plane being taken on the line 10—10 of Fig. 11.
Figure 12:
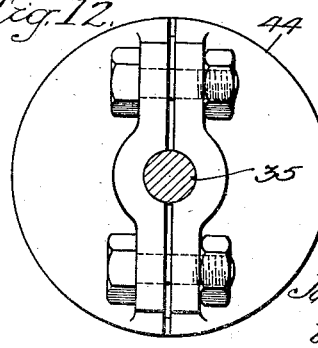
Fig. 12 is a detail, sectional view taken on the line 12—12 of Fig. 10.

Referring to Fig. 1, a car body 1 comprises a platform 2, a seat 3, a supporting structure 4 for said seat which extends upwardly from an outer edge 5 of the platform 2, and a suitable shock-resisting bumper 6 which encircles the outer edge 5 of the platform 2 as well as a base portion 7 of the structure 4. Opposite sides 8 and 9 of the platform 2 are provided with openings 11 and 12, respectively, through which traction wheels 13 and 14 extend from a metallic floor surface 15. The car wheels 13 and 14 are respectively provided with axles 16 and 17 which are supported in bearings 18 and 19 formed on opposite ends 21 and 22 of a bracket member 23, as illustrated in Fig. 3. The bracket member 23 extends transversely of the car platform 2 and it is secured to an underside 24 of the platform 2 by bolts 25, so that the member 23 may close partially a transversely-extending opening 26 in the platform 2. As shown in Fig. 10, the car wheel 13 is provided with a central hub portion 27, an outer rim 28 and an interconnecting web portion 29. An outer side 31 of the rim 28 is adapted to engage the metallic floor surface 15. An inner side 32 is adapted to co-act with a frictional driving element 33. The opposite car wheel 14 is similar in all respects to the car wheel 13 just described, and it also co-acts with a frictional driving element 34, Figs. 3 and 9.

The frictional driving element 33 may be actuated relative to the car wheel 13 to vary the driving effect of the former by means of a shaft 35, Fig. 10, which is rotatably supported eccentrically of the axis of a rotary bearing member 36. The bearing member 36 is journaled in an upper end of a standard 37 extending vertically from the bracket 23. The bearing member 36 may be moved by means of a downwardly-extending actuated lever 38. Thus, by reason of the eccentric position of the driving element 33, with respect to the central axis of the bearing member 36, when the latter is actuated by the lever 38, the frictional driving element 33 is moved into or out of engagement with the adjacent side 32 of the traction wheel 13, depending upon the direction of movement of said actuating member 38. The driving element 34 on the opposite side of the car is similarly mounted, whereby the movement of an operating lever 39 may cause the engagement or disengagement of the driving element 34 with respect to the car wheels 13. Figs. 7 and 8 illustrate respectively the result of moving the lever 38 forwardly, the frictional driving element 33 being actuated from its ineffective position to its effective position. Fig. 9 illustrates the disengagement of the frictional driving element 34 from its co-acting car wheel 14, occurring when the actuating level 39 is moved rearwardly from its normal mid-position, all as will presently appear.

In order that the shaft section 35 may be positively actuated by a driving motor 41 for all desired positions of the frictional driving element 33, a shaft section 42 of the motor 41 is provided with a pinion 43, as illustrated particularly in Figs. 10 and 11. The pinion 43 is mounted in axial alignment with the central axis of the movable bearing member 36. The adjacent end of the shaft 35 carries a two-part casing 44, an inner side of which is provided with gear teeth from an internal gear-wheel 45 adapted to mesh with the driving pinion 43. Inasmuch as the rotary bearing member 36, which carries the gear-wheel 45, is in alignment with the axis of the driving pinion 43, proper working relation is maintained between the two gear elements 43—45 for all positions of the driving element 33 relative to the car wheel 13. The opposite frictional driving element 44 is similarly connected to a shaft section 46 of the motor 41, whereby an operative connection may be continuously maintained therebetween for all working positions of the frictional driving element 34. The foregoing connection between the friction elements 33 and 34 and the motor 41 constitutes one of the features of the co-pending application of Robert J. Lusse, Serial No. 122,633, filed July 15, 1926.

The steering mechanism for the car comprises a rotary steering post 47 which is mounted at a forward end 48 of the car at least partially within a hood 49 which constitutes a continuation of the base portion 7 of the rear seat-supporting structure 4. The steering post 47 comprises a base section 51, which is mounted in a casting 52 for movement about a vertical axis, the casting 52 being bolted or otherwise secured to the underside 24 of the car platform 2 at the forward end 48 thereof. The lower end of the base section 51, which is positioned below the underside 24 of the platform 2, is provided with a fork 53 adapted to support rotatably a steering wheel 54. An upper end of the vertical post section 51 is provided with a bevel gear-wheel 55 which meshes with a bevel gear-wheel 56 on a lower end of a second section 57 of the steering post 47. The section 57 is supported at the lower end thereof in a bearing 58 carried by a bracket member 59 which is mounted on the upper side of the car platform 2. The post section 57 is rearwardly inclined, a portion 61 extending beyond the hood 49, so that an operating handle 62 may be accessible to a person occupying the seat 3. The upper end of the post section 57 may be supported by means of a bearing 63 extending downwardly from an upper rear portion 64 of the hood 49. Thus, the turning of the handle 62 causes the rotation of the shaft sections 51 and 57 and the corresponding movement of the steering wheel 54.

In accordance with my invention, pedal mechanism 65 is mounted within the hood 49 at the forward end 48 of the car, and it is associated by mechanism 66 with the actuated levers or members 38 and 39 in such manner that the frictional driving elements 33 and 34 may be rendered effective and ineffective merely by the operation of the pedal mechanism 65. As illutsrated in Figs. 1 and 3 to 9, inclusive, the mechanism 66 comprises a strap member 67 which is centrally mounted on the underside 24 of the platform 2 for longitudinal movement by means of supporting guides 68 and 69.

A forward end of the strap member 67 is provided with a recess 71 adapted to receive rigidly a lower end of an upright member 72. An upper end of the member 72 is connected by a link 73 and an arm 74 to the pedal mechanism 65, so that when the mechanism 65 is moved forwardly, a corresponding movement is imparted to the strap member 67. A rear end of the strap member 67 is provided with a depending portion 75 and a projecting portion 76. The portion 75 normally engages a forward edge portion 77 of the transversely extending frame 23 when the pedal mechanism is in its normal neutral position. At this time, the vertical arm 72 engages a rear wall 78 of an opening in the platform 2 through which it extends. A spring 79 has one end secured to the strap member 67 and the other end to the rear guide 69, whereby the pedal mechanism 65 and the mechanism 66 may be normally held in the neutral position of Fig. 1.

A cross bar 81 is supported on a horizontal portion 82 of an angle which, in turn, is welded or otherwise secured to the end portion 76 of the strap member 67. A vertical portion 83 of this angle serves to support one end of a rod 84, an opposite end 85 of which is provided with a contact portion constituting one element of a control switch 86. A co-acting portion 87 of the control switch 86 is mounted on a block 88 supported on a rear vertical flange 89 of the cross frame 23. The switch is so designed that the contact portions 86 and 87 thereof are disengaged when the parts are in the normal neutral position shown in Fig. 1 of the drawings, engagement occurring, however, prior to the actuation of the frictional driving elements 33 and 34 into engagement with their co-operating car wheels, so that the motor may be operated at normal speed when the load is thrown thereon, all as will presently appear. The switch 86 constitutes one of the features an application of Robert J. Lusse, Serial No. 122,633, filed July 15, 1926.

Opposite ends 91 and 92 of the cross bar 81 are positioned in the path of travel of the actuating arms 38 and 39 of the frictional driving elements 33 and 34, respectively, as shown particularly in Figs. 3 and 7, whereby abutments may be afforded these arms. The relation of the parts is such that when the foot-pedal mechanism 65 is in its normal position, the abutments provided by the cross member 81 are so positioned that the actuating members 38 and 39 are in their normal midposition, but when the mechanism 65 is moved forwardly into its operating position, the abutments are moved forwardly an amount sufficient to permit the actuating levers 38 and 39 to move the frictional driving elements 33 and 34 into engagement with their co-operating car wheels. Thus, when the pedal mechanism 65 is actuated into its forward position against the force of the spring 29, the cross member 81 moves from the position of Fig. 7 to the position of Fig. 8, leaving sufficient space between itself and the actuating levers 38 and 39 to permit the latter to move the frictional driving elements 33 and 34 into their working position. However, when the pressure on the pedal mechanism 65 is released, the spring 79 serves to return the parts to their original position, the abutments 91 and 92 of the cross member 81 moving to a distance sufficient to actuate the arms 38 and 39 from the position of Fig. 8 to the position of Fig. 7, where the frictional driving elements are again in their ineffective position.

As previously noted, one of the important features of my invention is the provision of a car characterized by the fact that it may be turned within a minimum radius and with a minimum effort. To this end, I provide a release mechanism 93 for the driving frictional elements 33 and 34, comprising a pair of cams 94 and 95, which are positioned on opposite sides of the steering wheel 54 and mounted by pivot bolts 96 and 97 to an underside of the casting 52. The cams 94 and 95 have been illustrated in the form of a pair of arms 98 and 99 which extend toward an anti-friction element 101 which is mounted on an upper side of a rearward extension 102 of the wheel fork 53. The cam 94 is provided with a curved portion 103 which normally abuts against the anti-friction element or shoulder 101 when the parts are in the position shown in Figs. 4 and 5, and a curved portion 104 which is concentric with the axis of rotation of the steering wheel 54. The arm 99 of the cam 95 is provided with a cam portion 105 corresponding to the opposite cam portion 103 of the arm 99 and a curved portion 106 which is concentric to the axis of rotation of the steering wheel 54, as in the case of the portion 104 of the opposite arm 98.

The cams 94 and 95 are provided with forwardly projecting arms 107 and 108 which are interconnected by a link 109, whereby a movement of one cam may be imparted to the other. Arms 111 and 112 also extend outwardly from the pivot bolts 96 and 97, affording widely spaced pivotal supports 113 and 114 for corresponding forward ends of operating rods or members 115 and 116. The opposite ends of these rods are connected by resilient devices 117 and 118 to the actuated levers 38 and 39 for the frictional driving elements 33 and 34, respectively.

The resilient device 117 comprises adjustable front and rear abutments 119 and 121. These abutments are respectively positioned on opposite sides of the lever arm 38. One end of a spring 122, which encircles the rear end portion of the rod 115, engages the rear abutment 121, while the opposite end engages an apertured portion 123 of the actuating lever 38 through which the rod 115 extends. The force of the spring 117 is such as to cause the arm 38 to engage the abutment 91 of the corresponding arm 81 whether the abutment 91 is in the normal position of Fig. 7 or in the forward position of Fig. 8. The force of the spring is also such that slippage of the frictional element 33 relative to the co-acting car wheel 13 is permitted when the motor 41 is subjected to more than a predetermined safe load.

It is noted that the spring 122 also causes the cam portion 105 to engage resiliently the anti-friction element 101 when the steering wheel 54 is in its mid-position. The resilient device 118, which is associated with the actuated arm 39, is similar in all respects to the device 117 just described comprising a pair of spaced abutments 124 and 125 and a spring 126 which serves to cause a portion 127 of the arm 39 to abut against the shoulder 92 of the cross member 81 regardless of whether this member is in the position of Fig. 7 or Fig. 8. The spring 126 also causes the cam portion 103 to abut against the anti-friction element 101. The combined force of the springs 117 and 118 is sufficient to overcome the force of the spring 79 which operates to return the frictional driving elements 33 and 34 to the position of Fig. 7 when the force is removed from the pedal mechanism 65.

The cam portion 103 is so designed that when the steering wheel 54 has moved only a very slight amount from its mid-position, for example, that illustrated in Fig. 5, the abutment 119 is actuated rearwardly by the arm 38 sufficiently to cause the frictional driving element 33 to be disengaged from its co-acting car wheel 14. The continued movement of the steering wheel 54 causes a further movement of the cam 95 until the rod 116 has been actuated forwardly an amount necessary to cause the desired compression of the spring 126. An increase in the force of the spring 126 is necessary since with the release of the driving frictional element 33, the power of the motor is transmitted to the car wheel 14 through the co-acting frictional driving element 34. When the force of the spring 126 has been increased to the desired value, the cam portion 103 has been actuated out of the path of travel of the shoulder or the anti-friction element 101 into operative relation to the cam portion 104.

Since the portion 104 is concentric with the axis of the steering wheel 54, the further turning of the steering wheel 54 fails to cause an increase in the compressive force of the spring 126 obtaining when the anti-friction element 121 is disengaged from the cam portion 103. The increased compressive force of the spring 126, however, should not be so great as to prevent slippage to occur between the car wheel 14 and the frictional element 34 when the load on the motor 41 exceeds a safe value. The cam portions 105 and 106 are designed similar to the portions 103 and 104, whereby the release of the driving frictional element 33 only may be caused when the steering wheel 54 is moved in the opposite direction from its mid-position and the compressive force of the spring 122 reached to a predetermined value only.

In summary, when the foot-pedal mechanism 65 is actuated forwardly in order to start the car, the strap member 67 is similarly actuated against the force of the spring 79, resulting in the movable contact portion 85 of the switch 86 engaging the stationary contact portion 87 thereof. When the switch is thus closed, the motor 41 is energized and the frictional elements 33 and 34 are rotated. During the forward movement of the strap member 67, the abutments 91 and 92 are also moved forwardly, permitting the springs 122 and 126 to expand and thereby force the levers 38 and 39 to follow the forward movement of the shoulders 91 and 92, respectively. As a result of such forward movement, the frictional driving elements 33 and 34 are actuated into engagement with their co-operating car wheels 13 and 14, but such engagement does not occur until after the motor 41 has been energized.

Should the operator desire to turn the car, say to the right, upon the initial movement of the steering wheel 54 from the position of Fig. 4 to the position of Fig. 5, the frictional driving element 33 is disengaged from its co-acting car wheel 14 by the rearward movement of the abutment 119. The continued turning of the wheel 54 causes the further swinging of the cam 95 until the force of the spring 126 is sufficient to prevent slippage between the frictional driving element 34 and the car wheel 14. At this moment, the anti-friction shoulder 101 is disengaged from the cam portion 103 during the remainder of the movement of the car wheel 54 into the position shown in Fig. 6. The force of the spring 126 is not increased since the cam portion 106 is concentric to the axis of rotation of the wheel 54. When the parts are in the position shown in Fig. 6, the frictional driving element 33 and its associated parts are in the position shown in Fig. 8, while the frictional driving element 34 and its associated parts occupy the position illustrated in Fig. 9. In the event that the operator should desire to stop the car, he merely releases the pedal mechanism 65, the spring 79 then causing the abutments 91 and 92 to be actuated rearwardly. The rearward movement of the abutment 91 disengages the connection between the driving frictional element 33 and the car wheel 13. At the same time, the motor 41 is deenergized by the opening of the switch 86.

Figure 2:
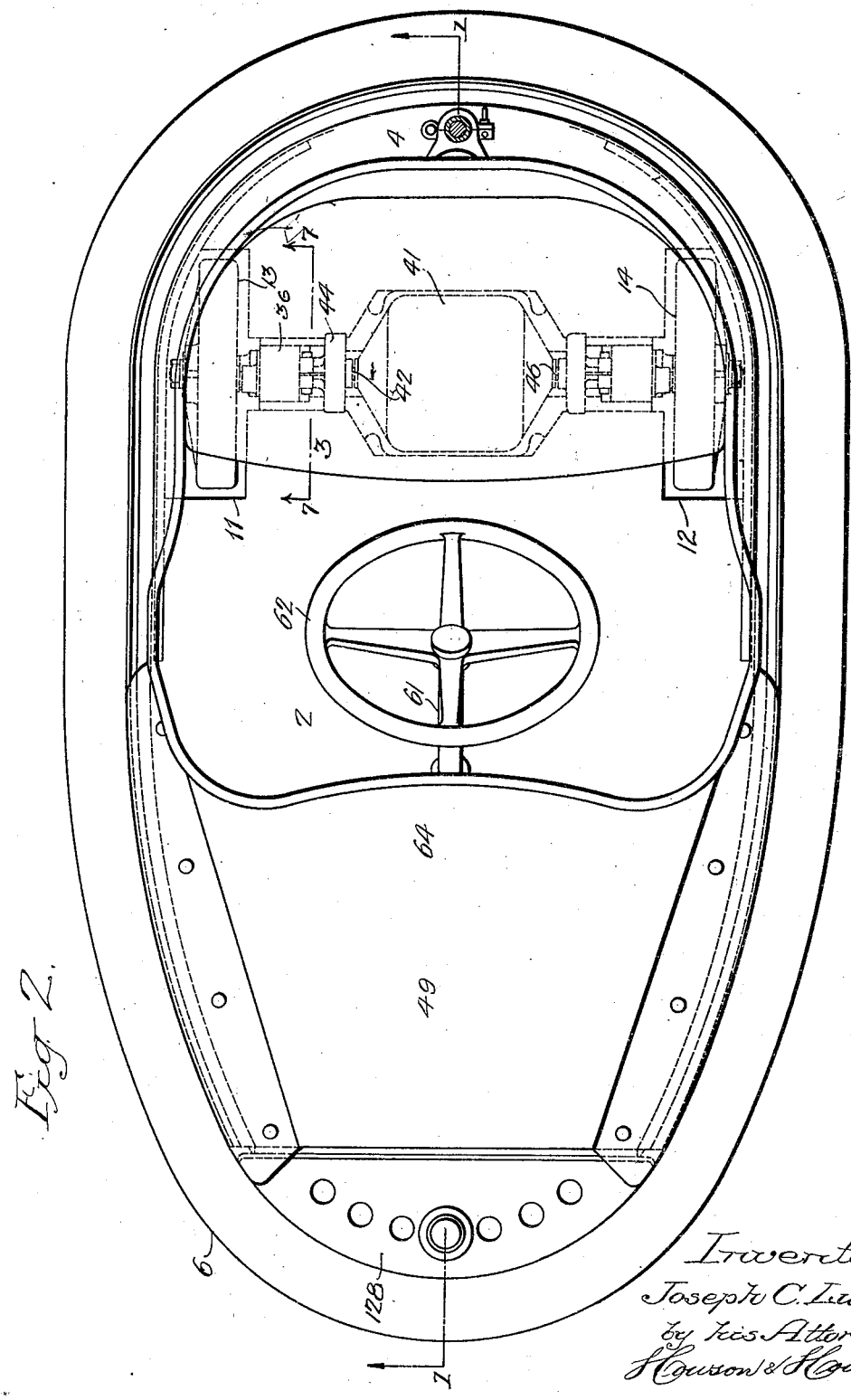
Fig. 2 is a top plan view of the structure of Fig. 1.

If, during the operation of the car, a collision should occur between the front end portion 48 thereof and a second car, experience has shown that the operator would be considerably jarred. In order to minimize the effect of so-called "head-on collisions", a resilient member 128 may be positioned between the edge 5 of the platform 2 at the forward end 48 thereof and the circular rubber bumper 6, as shown in Figs. 1 and 2. Such construction affords a flexure to the extent of at least six inches, as compared with one of three inches only, where the bumper 6 is used alone. A further description of this part is unnecessary in view of the fact that it constitutes a part of a copending application of Robert J. Lusse, Serial No. 308,264, filed Sept. 25, 1928.

While I have shown only one embodiment of my invention, for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. A pair of driven elements, driving means for said elements, means whereby said driving means may be rendered effective to actuate at least one of said driven elements, steering means, and means including a pair of independently pivoted cams for controlling said driving means upon a predetermined operation of said steering means, and a rigid link pivoted at its opposite ends to said cams respectively, whereby all pivotal movements of each of said cams will be positively and directly transmitted to the other of said cams.

2. A car having a pair of traction elements, a pair of driving elements therefor, steering means, mechanism for establishing a resilient engagement between said driving elements and said traction elements, a pair of independently pivoted cams operatively associated with said steering means and connected to said mechanism, and a rigid link pivoted at its opposite ends to said cams respectively, whereby all pivotal movements of each of said cams will be directly transmitted to the other of said cams, whereby the force of the resilient engagement between said driving elements and said driven elements may be simultaneously varied in reverse order.

3. A pair of traction elements, a pair of driving elements therefor, steering means, means tending to establish a resilient engagement between said driving elements and said traction elements, and a pair of cams having lost-motion connections to said driving means operatively associated with said mechanism.

4. A car having a pair of traction elements, a pair of driving elements therefor, steering means having a mid position, and means having resilient lost-motion connections to said driving elements, said last-mentioned means including a pair of cams positioned on opposite sides of the mid position of said steering means but in resilient engagement therewith.

5. In combination, a pair of operating rods, a pair of pivotally mounted cams affording mountings for corresponding ends of said rods, a pair of operating members having lost-motion connections with said rods, and steering means having lost-motion connections with said cams.

6. Apparatus of the character described comprising steering means having a mid position, a pair of cams positioned on opposite sides of said steering means in operative relation thereto, a pair of actuating members connected to said cams, and a pair of actuated members having resilient lost-motion connections with said actuating members, respectively.

7. In combination, a vehicle comprising a pair of independent cams, steering means movable into engagement with one or the other of said cams depending upon the direction of movement thereof, a link pivotally connected at its opposite ends to said cams for operatively associating said cams so that movement of one is transmitted to the other, a pair of rods actuated by said cams, respectively, and control means for said vehicle responsive to movements of said rods.

8. A car having steering means, a cam positioned in such relation to said steering means as to be actuated thereby for a predetermined portion of the movement of said steering means from its mid position, a second cam so positioned as to be actuated for a predetermined portion only of another movement of said steering means from its mid position, and driving elements for said car having lost-motion connections to said cams, respectively.

9. In combination, a pair of rotatable elements, a pair of rods having resilient lost-motion connections therewith, a pair of pivoted cams affording mountings for corresponding ends of said rods, and steering means for causing the turning of said cams so as to cause opposite movements of said rods, whereby the relative positions of said rotatable elements may be adjusted.

10. Apparatus of the character described comprising a pair of members to be actuated, a pair of actuating members therefor having resilient lost-motion connections therewith, a pair of pivotally mounted cams connected to said actuating members, respectively, means for interconnecting said cams so that a movement of one is imparted to the other, and steering means positioned in operative relation to said cams so that a movement thereof in either direction causes predetermined bodily movements of said cams.

11. In combination, an actuating member having a pair of spaced abutments, an actuating member intermediate said abutments, a spring extending between one of said abutments and said actuated member, steering means comprising a rocker arm, and a cam operatively connected to said actuating member and having one portion thereof normally held in abutting relation to said rocker arm of said steering means under the force of said spring.

12. A car provided with an actuated member, an actuating member provided with an abutment, a spring extending between said abutment and said actuated member, steering means, and a cam connected to said actuating member and having one portion in engagement with said steering means, so that a movement of the latter causes the actuation of said actuating member and the compression of said spring, said cam having another portion permitting the continued movement of the steering means without causing the further compression of said spring.

13. A vehicle comprising a pair of bodily movable actuated members, a pair of actuating members, a pair of springs tending to move said actuating members relative to said actuated members, a pair of cams connected to said pair of actuating members, a bodily movable control member, said springs serving to actuate said cams into abutting relation to said bodily movable member, each cam having one actuating portion only positioned in the path of movement of said bodily movable member.

14. In combination, an actuated member, an actuating member having an abutment, a spring extending between said abutment and said actuated member, a second abutment so positioned as to prevent other than a desired movement of said actuated member under the force of said spring, control means whereby said second abutment may be actuated from one position to another, steering means, and a cam connected to said actuated member, said cam being so positioned relative to said steering means as to be actuated upon a movement thereof.

15. A pair of actuated members, control means having movable abutments for said actuated members, a pair of actuating members having abutments, springs extending between said last-mentioned abutments and said actuated members tending to force the latter into engagement with said first-mentioned abutments, a pair of cams connected to said actuating members, and means so associated with said cams as to cause predetermined opposite movements of said actuated members only.

16. A car having foot-control mechanism, a pair of actuated control members, means affording abutments for said control members responsive to said foot control mechanism, a pair of actuating members having stops, springs extending between said stops and said actuated members, whereby the latter may tend to engage said abutments, a pair of interconnected cams affording mountings for said actuating members, respectively, steering means for said car positioned in such relation to said cams that said actuating members are moved in opposite directions upon a predetermined movement of said steering means, and abutments on said actuating members movable into engagement with said actuated members under predetermined conditions.

JOSEPH C. LUSSE.